C. L. KNECHT.

Covered Glassware.

No. 8,595. Reissued Feb. 25, 1879.

Witnesses.

R. P. Wunshall

R. H. Whittlesey

Inventor.

Charles L. Knecht by James L. Kay his Attorney

N. PETERS, PHOTO-LITHOGRAPHER, WASHINGTON, D. C.

UNITED STATES PATENT OFFICE.

CHARLES L. KNECHT, OF PITTSBURG, PENNSYLVANIA.

IMPROVEMENT IN COVERED GLASSWARE.

Specification forming part of Letters Patent No. 192,769, dated July 3, 1877; Reissue No. 8,595, dated February 25, 1879; application filed September 3, 1878.

*To all whom it may concern:*

Be it known that I, CHARLES L. KNECHT, of Pittsburg, in the county of Allegheny and State of Pennsylvania, have invented certain new and useful Improvements in Covered Glassware; and I do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1:
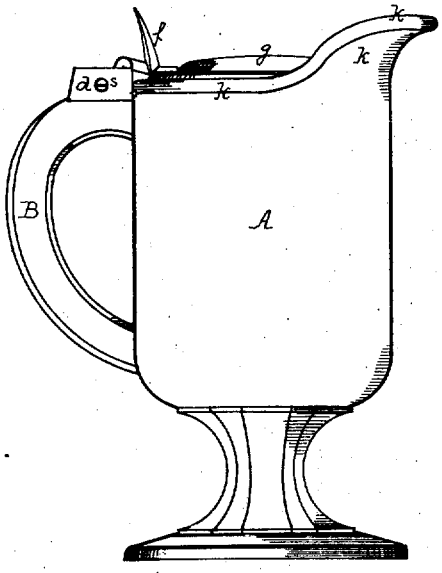
Figure 2:
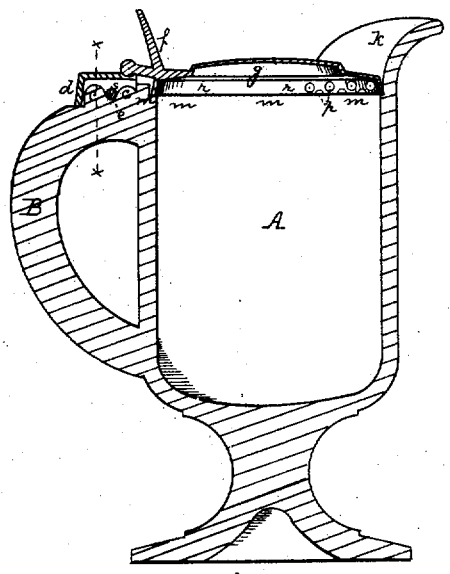
Figure 3:
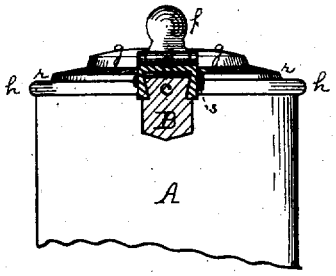
Figure 4:
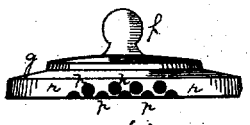

Figure 1 is a side elevation of a pitcher illustrating my improvement. Fig. 2 is a vertical central section of the same. Fig. 3 is a section through the line *x x*, Fig. 2, and Fig. 4 is a detached view of the lid.

Like letters of reference indicate like parts in each of the figures.

My invention relates to such articles of pressed glassware as are provided with hinged metallic covers or lids for the purpose of excluding any dust or soot, or preventing any insects from falling or flying into the contents thereof, such as pitchers, jugs, beer-mugs, and similar articles.

Heretofore the lids have usually been secured to these articles by hinges provided with arms, which fit down the sides of lugs on the vessels, and were provided with pintles or screws, which passed partly into or entirely through the body of the glass. These connections were objectionable, because of the liability of the pintles to work loose, and because the weight and strain of the lid was thrown onto the small portion of glass into or through which the pintles or screws impinged or passed. In some instances, also, hinges have been constructed with a dovetailed joint or connection with a view to correct these objectionable features; but these hinges are also subject to objections which materially affect their successful introduction. The deficiencies in such are lack of strength, neatness, cheapness, and a construction which will admit of the vessel being used either with or without a lid, and in both instances present a neat and finished appearance.

It is one of the main objects of the present invention to improve on the construction of such hinges, and more especially of those of the last-mentioned class, in which a solid lug or pin upon the hinge is secured between two projecting lugs or ears; and to this end my invention essentially consists in a dovetailed grooved metallic hinge constructed and secured upon a dovetailed projection, as hereinbefore more specifically described, whereby a finished article is obtained which possesses the advantages set forth. I propose, also, in connection with the hinged lid, to press an annular shoulder or seat within the pitcher or other ewer-shaped vessel, and below the rim or lip, for the reception of the metallic hinged lid, so as to adapt a circular or spun lid to any ewer-shaped or lipped glass vessel instead of the lid conforming to the lip or spout. I propose, also, to improve upon the ordinary mustache-guards or strainers used with cups, glasses, and the like; and to this end I provide the hinged cover with a series of perforations or small slots in the rim of the same. and next or adjacent to the mouth of the vessel, so that this cover when closed will rest upon the annular shoulder within the vessel, and the strainer may be readily and firmly held in its seat at such a distance below the rim or mouth of the vessel as that the strained liquid will collect in sufficient quantity to insure a steady and regular stream from the lip or rim of the vessel.

To enable others skilled in the art to make and use my invention, I will describe it more fully.

In the drawings referred to, A is the vessel or pitcher, and B the handle thereof. Extending along the top of the handle B is the dovetailed lug or projection *c*, the top of which is recessed, as at *e*. The metallic hinge *d* is formed with a dovetailed groove, *i*, corresponding to the dovetailed lug *c*, so that when slipped or placed on said lug it will form a joint or connection therewith. The screw or rivet *s*, passing through the hinge *d*, fits into the recess *e* on the lug *c*, and thus secures or keys the dovetailed joint together. It is evident that this keying of the connection could be accomplished in other ways; but I prefer the manner shown, as the screw *s*, passing through both sides of the hinge *d*, clamps them more firmly on the lug. If it is desired to use the vessel without the lid it presents a neat appearance, the lug not disfiguring the handle. The hinge *d* is provided with the thumb-piece *f*, and is secured to the lid in the usual manner.

By pressing the lip *k* and rim *h* of the pitcher thinner than the body A, I form an annular shoulder or seat, *m*, within the vessel and below the mouth or lip *k*. The circular or spun lid *g*, secured to the hinge *d*, fits inside the rim *h* and lip *k*, and rests upon the annular shoulder *m*, as shown in Fig. 2. In this way the circular hinged metallic lid *g* can be used with any ewer shaped or lipped glass vessel. The advantage of this construction can be readily seen, as it is exceedingly difficult to make the lid conform perfectly to the ewer-shaped lip, and when it does not fit closely the dust will pass through and injure the contents of the vessel.

When pitchers of this class are used for beer and other malt liquors, the froth or foam of the liquor gathers at the top of the pitcher, and the liquor cannot be poured without carrying the foam with it. To overcome this difficulty, I form on the rim *r* of the lid *g* next or adjacent to the pouring spout or lip *k* one or more perforations or openings, *p*, through which the liquor may be poured while the lid is held down in the pitcher and prevents the escape of the froth or foam. This I accomplish either by perforating or slotting the rim *r*, or soldering or otherwise fastening wire net-work therein, which will at the same time exclude the soot and dust and form a strainer for the liquid.

What I claim as my invention, and desire to secure by Letters Patent, is—

1. The metallic hinge *d*, formed with a dovetailed groove, *i*, and secured upon a dovetailed projection, *c*, upon the vessel, substantially as shown and set forth.

2. The metallic hinge herein described, consisting of a piece, *d*, with a recess, *i*, said recess being dovetailed in vertical section, closed at its end and top, and having a detachable pin or screw, said piece being adapted to fit over a correspondingly-dovetailed projection formed on the body of the cup, and having a groove to admit the pin or screw by which said piece *d* is held in position, substantially as set forth.

3. The ewer shaped or lipped glass vessel A, having the rim *h* formed thin, so as to form the annular seat or shoulder *m* within the body of the vessel, and below the rim and lip, for the reception of the circular metallic hinged lid *g*, substantially as and for the purposes set forth.

4. The hinged lid *g*, provided with a series of perforations, *p*, in combination with the glass vessel A, having an annular seat or shoulder, *m*, formed within the same and below the rim or lip of the vessel, as and for the purposes herein specified.

In testimony that I claim the foregoing I have hereunto set my hand this 28th day of August, 1878.

CHARLES L. KNECHT.

Witnesses:
JAMES I. KAY,
I. O. THOMAS.